(12) United States Patent
Feijoo et al.

(10) Patent No.: US 10,706,138 B2
(45) Date of Patent: Jul. 7, 2020

(54) NORMALIZING IDENTITY API CALLS FOR A SUITE OF MULTI-TENANT PRODUCTS ACROSS DISPARATE MULTI-TENANT AND SINGLE-TENANT IDENTITY DIRECTORIES

(71) Applicant: Citrix Systems, Inc., Fort Lauderdale, FL (US)

(72) Inventors: Ricardo F. Feijoo, Fort Lauderdale, FL (US); Thomas Kludy, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 185 days.

(21) Appl. No.: 15/628,807

(22) Filed: Jun. 21, 2017

(65) Prior Publication Data
US 2018/0373862 A1 Dec. 27, 2018

(51) Int. Cl.
*G06F 21/41* (2013.01)
*H04L 29/06* (2006.01)
*G06F 9/445* (2018.01)
*G06F 21/62* (2013.01)

(52) U.S. Cl.
CPC .......... *G06F 21/41* (2013.01); *G06F 9/44526* (2013.01); *G06F 21/6218* (2013.01); *H04L 63/0815* (2013.01); *H04L 63/205* (2013.01)

(58) Field of Classification Search
None
See application file for complete search history.

(56) References Cited

U.S. PATENT DOCUMENTS

| | | | | |
|---|---|---|---|---|
| 7,904,487 | B2* | 3/2011 | Ghatare | G06F 16/24522 707/803 |
| 8,224,873 | B1* | 7/2012 | Korablev | G06F 21/6218 707/809 |
| 10,303,527 | B1* | 5/2019 | Jones | G06F 9/542 |
| 2004/0267768 | A1* | 12/2004 | Harjanto | H04L 29/12141 |
| 2005/0091265 | A1* | 4/2005 | Rimer | G06F 9/4493 |
| 2012/0246695 | A1* | 9/2012 | Cameron | G06F 21/6218 726/1 |
| 2013/0024907 | A1* | 1/2013 | Pal | G06F 21/604 726/1 |

* cited by examiner

*Primary Examiner* — Kaveh Abrishamkar
(74) *Attorney, Agent, or Firm* — Fox Rothschild LLP; Robert J. Sacco; Carol E. Thorstad-Forsyth

(57) ABSTRACT

Systems and methods for operating a system including a plurality of directories. The methods comprises: receiving, by a computing device, a first search request for identity information associated with an individual user of the system that is in a common request format supported by a common Application Programming Interface ("API"); performing first operations by the computing device to generate second search requests by transforming a format of the first search request from the common request format to a plurality of directory search request formats respectively supported by the plurality of directories; and respectively communicating the second search requests to the plurality of directories for retrieving the identity information associated with an individual user of the system.

10 Claims, 3 Drawing Sheets

NORMALIZING IDENTITY API CALLS FOR A SUITE OF MULTI-TENANT PRODUCTS ACROSS DISPARATE MULTI-TENANT AND SINGLE-TENANT IDENTITY DIRECTORIES

BACKGROUND

Statement of the Technical Field

The present disclosure relates generally to computing systems. More particularly, the present disclosure relates to implementing systems and methods for normalizing Application Programming Interface ("API") calls for a suite of multi-tenant products across disparate multi-tenant and single-tenant directories.

Description of the Related Art

There are various conventional software solutions for allowing access to remote desktops, files and applications. For example, these conventional software solutions include Citrix Cloud, XenApp/XenDesktop ("XA/XD"), XenMobile/XM Essentials, ShareFile, and NetScaler Gateway ("NSG"). Each of the listed products has been developed independently and has evolved differently on how it deals with the underlying directory. All except NSG share the problem of supporting Active Directories ("ADs"). It is a large amount of work to support different directories, especially Azure ADs ("AADs").

In an attempt to "quickly" support AADs each product made different choices, but universally chose to treat Authentication to an AAD different from authorization. That is since the products were built to authorize using an AD, they chose to continue to do this rather than understand native AAD representations of objects. These decisions were facilitated by AAD support for syncing AD attributes to AAD. All teams used the synced attributes to map back to an attribute they already supported shown in the table below.

| Product | Attribute |
| --- | --- |
| XenApp/XenDesktop/Essentials/SecureBrowser | AAD SID claim direct |
| XenMobile/Essentials | UPN: UPN->SID conversion for user Group |
| ShareFile | No support for AAD, need AD GUID |
| Netscaler Gateway | Natively Support AAD OID |

To further exacerbate the problem, products need to support a customer starting with AD, configuring all their authorization, and then upgrading to AAD, without having to re-Authorize all the applications to new entities. Customers expect this behavior because of AAD's ability to sync attributes. To accomplish the above, a customer is forced, or desires, to Authorize using AD concepts even though they want to enable Authentication from AAD.

This is fine for each product individually, but in a cloud based system the administrator jointly authorizes access to applications in a unified User Interface ("UI"). Since different products expect different behavior, this would confuse the administrator. Take the example of configuring NSG applications and XA applications in the same UI. The administrator would have to choose AD objects for XA, but an AAD object for NSG.

SUMMARY

The present disclosure concerns implementing systems and methods for operating a system including a plurality of directories. The methods comprise receiving, by a computing device, a first search request for identity information associated with an individual user of the system that is in a common request format supported by a common Application Programming Interface ("API"). In some scenarios, the search request is received from (a) a relying party computing device that is trying to acquire identity information associated with the individual user who logged into the relying party computing device, or (b) a relying party computing device that is trying to find identity information in order to assign access control, monitor or audit the individual user.

After the reception of the search requests, first operations are performed by the computing device (e.g., by a plurality of plugins installed on the computing device) to generate second search requests by transforming a format of the first search request from the common request format to a plurality of directory search request formats respectively supported by the plurality of directories. The directory search request formats include, but are not limited to, an Analog Display Services Interface ("ADSI") protocol format, an Amazon Web Services ("AWS") protocol format, a Lightweight Directory Access Protocol ("LDAP") format, a Directory Access Protocol ("DAP") format, a Domain Name System ("DNS") protocol format, a Network Information Service ("NIS") protocol format, a Microsoft Graph API protocol format, or a proprietary protocol format. The second search requests are then respectively communicated to the plurality of directories for retrieving the identity information associated with an individual user of the system.

Thereafter, the computing device receives first responses from the plurality of directories including the identity information associated with an individual user of the system. Each of the responses is in a native response format supported by a respective directory of the plurality of directories. The computing device (e.g., a plurality of plugins installed on the computing device) performs second operations to generate second responses by translating a format of each said first response from the native response format to a common response format supported by the API. The second responses are communicated from the computing device to a remote device from which the first search request was received.

BRIEF DESCRIPTION OF THE DRAWINGS

The present solution will be described with reference to the following drawing figures, in which like numerals represent like items throughout the figures.

DETAILED DESCRIPTION

Figure 1:
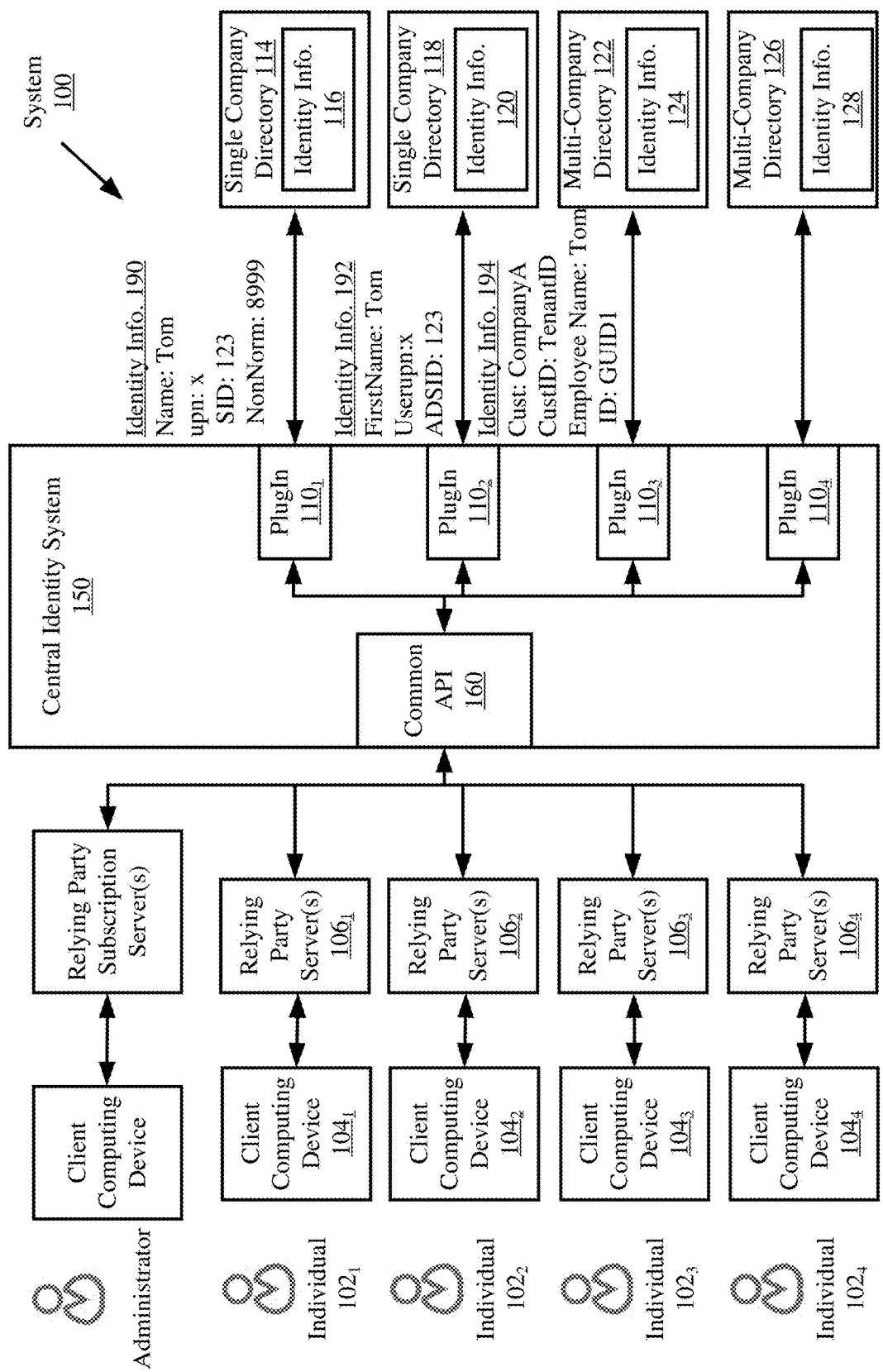
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In conventional network based systems, Identity Service Providers ("ISPs") often use different technologies for Identity Management ("IdM") or Identity Access Management ("IAM"). An IdM (or IAM) provides a means to allow the right individuals to access the right network resources (e.g., network devices, files, documents, etc.) at the right times and for the right reasons. In this regard, the IdM (or IAM) comprises a module operative to authenticate the identity of users via user credentials (e.g., user names, passwords, security tokens) and authorize user access to network resources based on data describing the information that the user is authorized to access and/or actions that the users are authorized to perform. This utilization of different technologies for IdM (or IAM) purposes provides an undesirable amount of difficulty with regard to system maintenance, configuration and modification.

A barrier to supporting a new IdM (or IAM) technology across a suite of related products is the need to have all the products understand how to interact with each ISP system. Each ISP system has its own IdM (or IAM) schema and methods for communicating objects through claims. The word "claim", as used herein, refers to any piece of data about a user. The user (in this context) includes, but is not limited to, a software application, a network device, or an end user. A claim can include, but is not limited to, a name, a location, a privilege level, a group association, a device type, or a preference. The unique set of claims for a user constitutes that user's identity within a computing system. These claims are provided to relying parties through an issuing authority (e.g., a Security Token Service ("STS") for use in authorizing access to resources. Whenever a group of related products wants to support a new IdM (or JAM) technology, each product needs to understand the same and have code added thereto for supporting the new IdM (or JAM) schema.

A barrier to supporting a single-tenant ISP system in a multi-tenant product is making any claims associated with that ISP system globally unique. The multi-tenant product implements a software architecture in which a single instance of software runs on a server and serves multiple tenants. A tenant is a group of users who share a common access with specific privileges to the software instance. The attributes used in the multi-tenant product are not globally unique. Below is a table that adds uniqueness to the attributes each of a plurality of multi-tenant products is using.

| Product | Attribute | Uniqueness |
| --- | --- | --- |
| XenApp/XenDesktop/Essentials/ SecureBrowser | AAD SID claim direct | Customer |
| XenMobile/Essentials | UPN: UPN->SID conversion for user Group | Customer |
| ShareFile | No support for AAD, need AD GUID | Global |
| Netscaler Gateway | Natively Support AAD OID | Global |

As you can see, there is a need for an anchor to each of the claims that sets customer context because the claims themselves are not globally unique across all customers.

The present solution leverages a central identity system that integrates with each new ISP and normalizes the APIs of each ISP so that a suite of products only needs to integrate with the normalized API. In effect, the suite of products are able to instantly support any new ISP added to the central identity system. The central identity system standardizes this by the use of identity plugins that play the role of translator from the new ISP being added to a common API agreed to by the suite of products or relying parties. This common API schema provides a directory based system that does not require the relying parties to understand individual directory APIs, and allows the relying parties to support many directories thought the implementation of only one directory API.

Referring now to FIG. 1, there is provided a schematic illustration of an exemplary system 100. System 100 is generally configured to normalize API function calls across disparate identity directories. System 100 employs claims-based identity to allow relying party products to acquire the identity information they need about users. Claims-based identity abstracts the individual elements of identity and access control into two parts: a notion of claims; and the concept of an issuer or authority. A claim is a statement an entity makes about itself in order to establish access to a network resource. A claim can include, but is not limited to, a name, a location, a privilege level, a group association, a device time, and/or a preference. Sets of claims are securely contained as one or more tokens.

System 100 comprises a plurality of client computing devices 104₁, 104₂, 104₃, 104₄ being respectively used by individuals 102₁, 102₂, 102₃, 102₄ to access resources hosted by relying party servers 106₁, 106₂, 106₃, 106₄. The client computing devices include, but are not limited to, desktop computers, laptop computers, personal computers, personal digital assistants, smart phones, and/or mobile phones. Each of the listed computing devices is well known in the art, and therefore will not be described herein. The individuals 102₁, 102₂, 102₃, 102₄ are employees of the same company or different companies. The relying party servers provide access to various resources. These resources include, but are not limited to, secure claims-based software applications, web applications, and/or web services.

In order to obtain access to the resources, an authentication process is performed to ensure that only those authorized individuals gain access thereto. This authentication process is implemented via a central identity system 150 and directories 114, 118, 122, 126. The central identity system 150 has different plug-ins 110₁, 110₂, 110₃, 110₄ that communicate with backend directories 114, 118, 122, 126. Each directory is a source of identity information 116, 120, 124, or 128. The directory 114, 118, 122, 126 can be a single company (or tenant) directory or a multi-company (or multi-tenant) directory. Both of these types of directories are well known in the art, and therefore will not be described herein.

In conventional single company directory scenarios, a company may use a Microsoft® Active Directory ("AD") that is installed locally in a datacenter. The Microsoft® AD comprises a datastore containing identity information exclusively for all of its employees. This identity information comprises employee names, user names, passwords, addresses, phone numbers, managers, and other individual identifying information. The Microsoft® AD also contains information about how individuals in the company can be grouped together (e.g., an accounting group, a legal team, an engineering team, etc.). This identity information is used to allow employees to access resources (e.g., software applications, folders, files, and/or documents) of the company's network (e.g., an Intranet). The present solution is not limited to the particulars of the example.

In a conventional multi-company directory scenario, multiple companies may use the cloud hosted Azure® AD. The Azure® AD comprises a datastore containing identity information for employees of multiple companies. This identity information comprises employee names, user names, passwords, addresses, phone numbers, managers, and other individual identifying information. The Azure® AD also contains information about how individuals in each company can be grouped together (e.g., an accounting group, a legal team, an engineering team, etc.). This identity information is used to allow employees to access resources (e.g., software applications, folders, files, and/or documents) of their respective company's network (e.g., Intranets). The present solution is not limited to the particulars of the example.

The present solution allows employees of companies to use their own identity information to login to a variety of relying party products (e.g., web services hosted by web servers 106₁, 106₂, 106₃, 106₄) which are accessible via the Internet, regardless of whether the identity information is stored in a single company directory or a multi-company directory. In this regard, the employees are able to sign into the relying party products using the identity that the employees use to access the company's network resources, i.e., each employee uses the same user name and password to login to the company's network and to obtain access to relaying party products via the Internet (e.g., web services accessible via a web browser).

During operation, the relying party servers 106₁, 106₂, 106₃, 106₄ count on the central identity system 150 to provide identity information for an individual who has logged in thereto or for finding information about an individual in order to assign access control, monitor or audit the individual. For example, an administrator named Rick wants to assign a resource in a relying party to a user named Tom. In order to do so, the relying party must have full details of the user Tom regardless in which directory identifying information for Tom is located. Similarly, Rick may want to view details of Tom in an administrative console, such as which resources Tom has access to, is currently accessing, or has accessed in the past. In this scenarios, the relying party must have full details of user Tom as well, and the administrative user interface may show the full details of user Tom as part of the monitoring or audit report.

Figure 2:
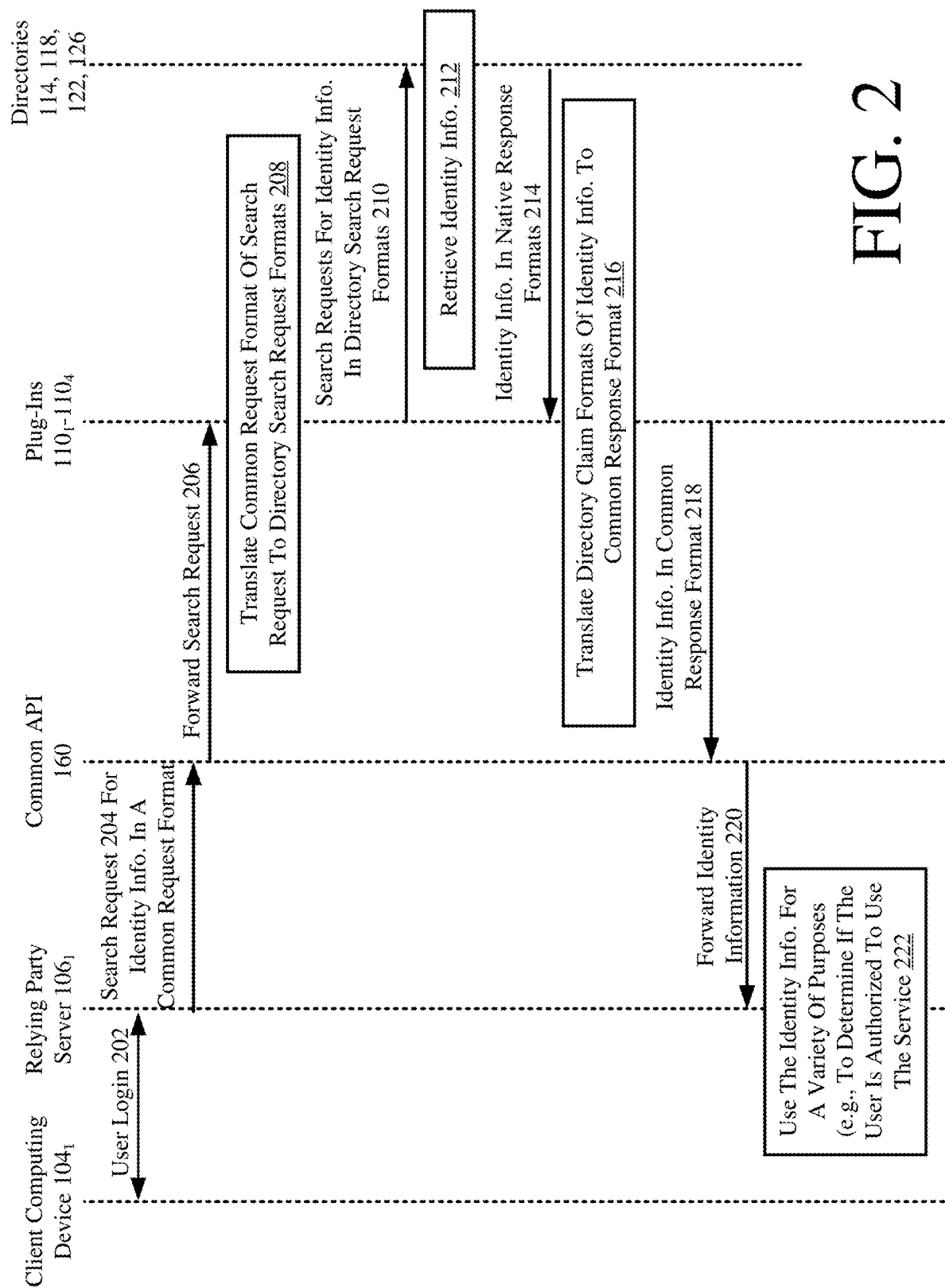
FIG. 2 is an illustration that is useful for understanding a multi-directory data acquisition process in accordance with the present solution.

As shown in FIGS. 1-2, a relying party server 106₁ communicates a search request for identity information associated with an individual (e.g., Tom) to a common API 160 of the central identity system 150 (e.g., subsequent to a successful user login), as shown by 202-204. The search request is in a common request format supported by the common API 160 of the central identity system 150.

For example, the following search request is generated by the relying party server 106₁ and communicated to the common API 160:

```
GET {customer}/Forests/{forest}/Domains/{domain}/
Users?provider={provider}
&admin={admin}&key={key}&SearchType=
{SearchType}&GroupCategory={GroupCategory}
&GroupScope={GroupScope}&Filter={Filter}&Container={Container}
&Skip={Skip}&Take={Take}&Recursive={Recursive}
``` where {customer} is the customer that owns the directory to search, and {forest} is a "domain trust scope". Some directory types allow multiple individual IDP domains to be connected to each other. When configured in this way, it means that an identity in one domain can be accessed from within any of the domains in the forest. If an IDP does not support the concept of a forest, this field may be left blank. {domain} is a scope of identity management within an IDP. For example, users may be separated between domains in order to apply different policies to them. Some IDPs support only a single domain. {provider} is the type of IDP (e.g., Active Directory or Azure Active Directory). {admin} is the name of a user in the directory who has sufficient rights to search for users within the directory. {key} is a token that allows the system to perform the search in the context of the {admin} identity. {SearchType} can limit the search to return users, groups, or both. {GroupCategory} and {GroupScope} can limit the search to return only groups of specific types. {Filter} allows the caller to specify a search pattern. For example to search for users containing the word "Tom". {Container} allows the caller to specify finer-grained containers in the directory. For example, to search for users inside of a specific group. {Skip} and {Take} allow the caller to skip the first (N) results and then return a given number of results. This allows returning the results to the caller in a series of "pages" when there may be thousands of results to a query. {Recursive} allows the caller to specify whether to search only in the specified {Container}, or to search children of the {Container} as well. By varying {forest}, {domain}, and {provider}, the same API can be used to perform searches across any identity provider that the customer owns. The identity system includes provisions for the customer to register their identity providers, so that the relying parties $106_1$-$106_4$ know the valid values that they can pass into these parameters. The present solution is not limited to the particulars of this example. Other search request formats can alternatively be employed with variations in the enumerations of forests, domains, servers and containers. Other illustrative search requests having the common request format are provided in the following Table 1.

TABLE 1

| API | Description |
|---|---|
| Federated Domain Operations | |
| DELETE {customer}/FederatedDomains/{targetcustomer}/{id} | Deletes an existing federated domain. Note: This API is called under the pod customer context. |
| POST {customer}/FederatedDomains | Creates a new federated domain. Note: This API is called under the pod customer context. |
| Forests Operations | |
| GET {customer}/Forests | Enumerate a Customer's Forests. |
| GET {customer}/forests/agents?ContinuationToken={ContinuationToken}&Take={Take}&CreatedDate={CreatedDate} | Enumerate all forests agents and their connectivity for all customers. |
| GET {customer}/Forests/{forest}?provider={provider} | Get information for Customer's Forest |
| GET {customer}/Forests/{forest}/Domains?provider={provider}&parentDomain={parentDomain}&admin={admin}&key={key}&SearchType={SearchType}&GroupCategory={GroupCategory}&GroupScope={GroupScope}&Filter={Filter}&Container={Container}&Skip={Skip}&Take={Take}&Recursive={Recursive} | Enumerate domains in Forest |
| GET {customer}/Forests/{forest}/Domains/{nameOrId}?provider={provider}&admin={admin}&key={key} | Get a specific Domain within the forest |
| GET {customer}/Forests/{forest}/Domains/{domain}/Servers?provider={provider}&admin={admin}&key={key}&SearchType={SearchType}&GroupCategory={GroupCategory}&GroupScope={GroupScope}&Filter={Filter}&Container={Container}&Skip={Skip}&Take={Take}&Recursive={Recursive} | GetForestDomainServers will return the DirectoryServer that the domain is conneccted to |
| GET {customer}/Forests/{forest}/Domains/{domain}/PreferredServer?provider={provider}&admin={admin}&key={key} | GetPreferredForestDomainServer will return the DirectoryServer that the domain is conneccted to |
| POST {customer}/Forests/{forest}/Domains/{domain}/Users/{id}/Groups?provider={provider}&admin={admin}&key={key}&server={server} | Attempt to join a user to some Groups or leave a group (specified in the request) |
| POST {customer}/Forests/{forest}/Domains/{domain}/Servers/{server}/Users/{id}/Groups?provider={provider}&admin={admin}&key={key} | Attempt to join a user to some Groups or leave a group (specified in the request) |
| GET {customer}/Forests/{forest}/Domains/{domain}/Users/{id}/Groups?provider={provider}&admin={admin}&key={key}&groupCategory={groupCategory}&groupScope={groupScope} | Get the group objects for a specific User within a specific domain |
| GET {customer}/Forests/{forest}/Domains/{domain}/Users?provider={provider}&admin={admin}&key={key}&SearchType={SearchType}&GroupCategory={GroupCategory}&GroupScope={GroupScope}&Filter={Filter}&Container={Container}&Skip={Skip}&Take={Take}&Recursive={Recursive} | GetForestDomainUsers will return users for the specific domain |
| GET {customer}/Forests/{forest}/Domains/{domain}/Users/{id}?provider={provider}&admin={admin}&key={key}&server={server} | Get a specific User within a specific domain |
| GET {customer}/Forests/{forest}/Domains/{domain}/Servers/{server}/Users/{id}?provider={provider}&admin={admin}&key={key} | Get a specific User within a specific domain |
| POST {customer}/Forests/{forest}/Domains/{domain}/Users?server={server} | Create a User on a specific forest and domain |
| POST {customer}/Forests/{forest}/Domains/{domain}/Servers/{server}/Users | Create a User on a specific forest and domain |
| DELETE {customer}/Forests/{forest}/Domains/{domain}/Users/{userId}?provider={provider}&admin={admin}&key={key}&server={server} | Delete/Remove a user from a specific forest and domain |

TABLE 1-continued

| API | Description |
|---|---|
| DELETE {customer}/Forests/{forest}/Domains/{domain}/Servers/{server}/Users/{userId}?provider={provider}&admin={admin}&key={key} | Delete/Remove a user from a specific forest and domain |
| POST {customer}/Forests/{forest}/Domains/{domain}/Users/{userId}/ChangePassword?provider={provider}&server={server} | ForestDomainUserChangePassword - will call the necessary interface on the desired identity provider in an attempt to change the user's password. |
| POST {customer}/Forests/{forest}/Domains/{domain}/Servers/{server}/Users/{userId}/ChangePassword?provider={provider} | ForestDomainUserChangePassword - will call the necessary interface on the desired identity provider in an attempt to change the user's password. |
| POST {customer}/Forests/{forest}/Domains/{domain}/Users/{userId}/ResetPassword?provider={provider}&server={server} | ForestDomainUserResetPassword - will call the necessary interface on the desired identity provider in an attempt to reset or change the user's password based on whether an old password was provided or not. |
| POST {customer}/Forests/{forest}/Domains/{domain}/Servers/{server}/Users/{userId}/ResetPassword?provider={provider} | ForestDomainUserResetPassword - will call the necessary interface on the desired identity provider in an attempt to reset or change the user's password based on whether an old password was provided or not. |
| GET {customer}/Forests/{forest}/Users/{id}?provider={provider}&admin={admin}&key={key}&filter={filter} | Get a specific User within a specific forest |
| GET {customer}/Forests/{forest}/Users?provider={provider}&admin={admin}&key={key}&SearchType={SearchType}&GroupCategory={GroupCategory}&GroupScope={GroupScope}&Filter={Filter}&Container={Container}&Skip={Skip}&Take={Take}&Recursive={Recursive} | Enumerate users in Forest |
| POST {customer}/Forests/{forest}/Domains/{domain}/Groups?server={server} | Create a Group on a specific forest and domain |
| POST {customer}/Forests/{forest}/Domains/{domain}/Servers/{server}/Groups | Create a Group on a specific forest and domain |
| DELETE {customer}/Forests/{forest}/Domains/{domain}/Groups/{groupId}?provider={provider}&admin={admin}&key={key}&server={server} | Delete/Remove a group from a specific forest and domain |
| DELETE {customer}/Forests/{forest}/Domains/{domain}/Servers/{server}/Groups/{groupId}?provider={provider}&admin={admin}&key={key} | Delete/Remove a group from a specific forest and domain |
| POST {customer}/Forests/{forest}/Domains/{domain}/Entity/Groups | GetDomainEntityGroups will return Entities (groups) for the specific domain. |
| POST {customer}/Forests/{forest}/Domains/{domain}/Entity/Groups/{id} | Get a specific Entity (Group) within a specific domain. |
| POST {customer}/Forests/{forest}/Domains/{domain}/Entity/Groups/{id}/Members | Get get the entities for the members of the given group. |
| POST {customer}/Forests/{forest}/Domains/{domain}/Entity/Users | GetDomainEntityUsers will return Entities (users) for the specific domain. |
| POST {customer}/Forests/{forest}/Domains/{domain}/Entity/Users/{id} | Get a specific Entity (User) within a specific domain. |
| GET {customer}/Forests/{forest}/Domains/{domain}/Computers?provider={provider}&admin={admin}&key={key}&server={server}&SearchType={SearchType}&GroupCategory={GroupCategory}&GroupScope={GroupScope}&Filter={Filter}&Container={Container}&Skip={Skip}&Take={Take}&Recursive={Recursive} | GetForestDomainComputers will return computers within the Forest / Domain. |
| GET {customer}/Forests/{forest}/Domains/{domain}/Servers/{server}/Computers?provider={provider}&admin={admin}&key={key}&SearchType={SearchType}&GroupCategory={GroupCategory}&GroupScope={GroupScope}&Filter={Fliter}&Container={Container}&Skip={Skip}&Take={Take}&Recursive={Recursive} | GetForestDomainComputers will return computers within the Forest / Domain. |
| GET {customer}/Forests/{forest}/Domains/{domain}/Computers/{computer}?provider={provider}&admin={admin}&key={key}&server={server} | GetForestDomainComputer will get a specific Computer from within the forest / domain. |
| GET {customer}/Forests/{forest}/Domains/{domain}/Servers/{server}/Computers/{computer}?provider={provider}&admin={admin}&key={key} | GetForestDomainComputer will get a specific Computer from within the forest / domain. |
| POST {customer}/Forests/{forest}/Domains/{domain}/Computers?server={server} | Create a Computer on a specific forest and domain. |

TABLE 1-continued

| API | Description |
|---|---|
| POST {customer}/Forests/{forest}/Domains/{domain}/Servers/{server}/Computers | Create a Computer on a specific forest and domain. |
| DELETE {customer}/Forests/{forest}/Domains/{domain}/Computers/{computerId}?provider={provider}&admin={admin}&key={key}&server={server} | Delete/Remove a computer from a specific forest and domain. |
| DELETE {customer}/Forests/{forest}/Domains/{domain}/Servers/{server}/Computers/{computerId}?provider={provider}&admin={admin}&key={key} | Delete/Remove a computer from a specific forest and domain. |
| POST {customer}/Forests/{forest}/Domains/{domain}/Computers/{computerId}/ChangePassword?provider={provider}&server={server} | ForestDomainComputerChangePassword - will call the necessary interface on the desired identity provider in an attempt to change the password associated with a computer account. |
| POST {customer}/Forests/{forest}/Domains/{domain}/Servers/{server}/Computers/{computerId}/ChangePassword?provider={provider} | ForestDomainComputerChangePassword - will call the necessary interface on the desired identity provider in an attempt to change the password associated with a computer account. |
| POST {customer}/Forests/{forest}/Domains/{domain}/Computers/{computerId}/ResetPassword?provider={provider}&server={server} | ForestDomainComputerResetPassword - will call the necessary interface on the desired identity provider in an attempt to reset or change the computer's password based on whether an old password was provided or not. |
| POST {customer}/Forests/{forest}/Domains/{domain}/Servers/{server}/Computers/{computerId}/ResetPassword?provider={provider} | ForestDomainComputerResetPassword - will call the necessary interface on the desired identity provider in an attempt to reset or change the computer's password based on whether an old password was provided or not. |
| POST {customer}/Forests/{forest}/Domains/{domain}/Computers/{computerId}/EnableDisable?provider={provider}&admin={admin}&key={key}&setEnabled={setEnabled}&server={server} | ForestDomainComputerEnableDisable - will call the necessary interface on the desired identity provider in an attempt to enable or disable (e.g. change the state) of the computer account. |
| POST {customer}/Forests/{forest}/Domains/{domain}/Servers/{server}/Computers/{computerId}/EnableDisable?provider={provider}&admin={admin}&key={key}&setEnabled={setEnabled} | ForestDomainComputerEnableDisable - will call the necessary interface on the desired identity provider in an attempt to enable or disable (e.g. change the state) of the computer account. |
| GET {customer}/Forests/{forest}/Computers/{computer}?provider={provider}&admin={admin}&key={key}&filter={filter} | Get a specific Computer within a specific forest |
| GET {customer}/Forests/{forest}/Computers?provider={provider}&admin={admin}&key={key}&SearchType={SearchType}&GroupCategory={GroupCategory}&GroupScope={GroupScope}&Filter={Fliter}&Container={Container}&Skip={Skip}&Take={Take}&Recursive={Recursive} | Enumerate Computers in Forest |
| GET {customer}/Forests/{forest}/Domains/{domain}/Servers/{server}/Containers/{container}?provider={provider}&admin={admin}&key={key} | GetForestDomainContainer will get a specific Container from the forest / domain |
| GET {customer}/Forests/{forest}/Domains/{domain}/Containers/{container}?provider={provider}&admin={admin}&key={key}&server={server} | GetForestDomainContainer will get a specific Container from the forest / domain |
| GET {customer}/Forests/{forest}/Domains/{domain}/Containers?provider={provider}&admin={admin}&key={key}&SearchType={SearchType}&GroupCategory={GroupCategory}&GroupScope={GroupScope}&Filter={Filter}&Container={Container}&Skip={Skip}&Take={Take}&Recursive={Recursive} | GetForestDomainContainers will return containers (e.g. OU) for the specific forest / domain |
| POST {customer}/Forests/{forest}/Domains/{domain}/Containers?server={server} | Create a container (OU) on a specific forest and domain |
| POST {customer}/Forests/{forest}/Domains/{domain}/Servers/{server}/Containers | Create a container (OU) on a specific forest and domain |
| DELETE {customer}/Forests/{forest}/Domains/{domain}/Containers/{container}?provider={provider}&admin={admin}&key={key}&server={server} | Delete/Remove a container from a specific forest and domain |
| DELETE {customer}/Forests/{forest}/Domains/{domain}/Servers/{server}/Containers/{container}?provider={provider}&admin={admin}&key={key} | Delete/Remove a container from a specific forest and domain |
| GET {customer}/Forests/{forest}/Containers/{container}?provider={provider}&admin={admin}&key={key} | Get a specific Container from a forest |
| GET {customer}/Forests/{forest}/Containers?provider={provider}&admin={admin}&key={key}&SearchType={SearchType}&GroupCategory={GroupCategory}&GroupScope={GroupScope} | Enumerate Containers in Forest |

TABLE 1-continued

| API | Description |
|---|---|
| &Filter={Filter}&Container={Container}&Skip={Skip}&Take={Take}&Recursive={Recursive} | |
| GET {customer}/Forests/{forest}/Domains/{domain}/Users/{userId}/Authenticate?provider={provider}&key={key} | Authenticate - will call AuthenticateUser for the specific Identity Provider. The Users/{id}/Authenticate endpoint is used to authenticate the given user and get their user object given the user Name or SID in AD and domain |
| GET {customer}/Forests/{forest}/Users/{userId}/Authenticate?provider={provider}&key={key} | Authenticate - will call AuthenticateUser for the specific Identity Provider. The Forest/{forest}/Users/{userId}/Authenticate endpoint is used to authenticate the given user within the forest and get their user object given the user Name or SID in AD and domain |
| GET {customer}/Forests/{forest}/Domains/{domain}/Users/{userId}/LogonUser?provider={provider}&key={key} | LogonUser - will call the specific Identity Provider and attempt a user logon (e.g. authentication) |
| GET {customer}/Forests/{forest}/Users/{userId}/LogonUser?provider={provider}&key={key} | LogonUser - will call the specific Identity Provider and attempt a user logon (e.g. authentication) |
| GET {customer}/Forests/{forest}/Providers/{identityProvider}/Ping | Ping the Identity Provider for the Forest (if it supports it) Sample URL: /acme/Forests/acme.com/Providers/AD/Ping |
| GET {customer}/Forests/{forest}/Providers/{identityProvider}/Version | ProviderVersionAsync - implements Version for the identity provider for the forest Sample URL: /acme/Forests/acme.com/Providers/AD/Version |
| Identity Operations | |
| GET {customer}/Providers/{identityProvider}/Cache | Ping the Identity Provider (if it supports it) Sample URL: /acme/Providers/AD/Cache |
| GET {customer}/Providers/{identityprovider}/Ping | Ping the Identity Provider (if it supports it) Sample URL: /acme/Providers/AD/Ping |
| GET {customer}/Providers/{identityprovider}/Version | ProviderVersionAsync - implements Version for the specific identity provider Sample URL: /acme/Providers/AD/Version |
| GET {customer}/Providers/Version | Providers Version - will issue a version to each forest defined for the customer Sample URL: /acme/Providers/Version |
| GET {customer}/Providers/Ping | ProvidersPing will issue a ping to each forest defined for the customer Sample URL: /acme/Providers/Ping |
| Ping Operations | |
| GET {customer}/Ping | Ping is the Main endpoint (HttpGet) - invoke via http://service/Ping |
| Subscription Domains Operations | |
| GET {customer}/SubscriptionDomains | Return the configured subscription domains. |
| POST {customer}/SubscriptionDomains | Creates a new subscription domain. |
| DELETE {customer}/SubscriptionDomains/{id} | Deletes an existing subscription domain. |
| PUT {customer}/SubscriptionDomains/{id} | Updates an existing subscription domain. |

The common API 160 passes or forwards the received search request to a plurality of plug-ins $110_1$, $110_2$, $110_3$, $110_4$, as shown by 206. In 208, each plug-in transforms the format of the search request from the common request format to a directory search request format supported by a respective directory 114, 118, 122 or 126. The directory search request format is defined by the particular protocol employed by the respective directory. The protocol includes, but is not limited to, an Analog Display Services Interface ("ADSI") protocol, Amazon Web Services ("AWS") protocol, a Lightweight Directory Access Protocol ("LDAP"), X.500 Directory Access Protocol ("DAP"), a Domain Name System ("DNS") protocol, a Network Information Service ("NIS") protocol, a Microsoft® Graph API protocol format, and/or a proprietary protocol format. Each of the listed protocols is well known in the art, and therefore will not be described herein.

For example, if plug-in $110_1$ is an Active Directory ("AD") plugin, then the search request is translated into one or more of ADSI, AWS or LDAP protocol formats suitable for querying the AD, depending on the search parameters passed in. If plug-in $110_2$ is an Azure® AD plugin, then the search request is translated into a Microsoft® Graph API protocol format for the Azure® AD. If plug-in $110_3$ is a Citrix.com identity plugin, then the search request is translated into API calls in accordance with a proprietary protocol owned by Citrix. The present solution is not limited to the particulars of this example.

Thereafter in 210, the plug-ins communicate the requests in the directory search request formats to the directories 114, 118, 122, 126. In turn, the directories retrieve the requested identity information 190-194 in 212, and return the same to the plug-ins $110_1$-$110_4$ of the central identity system 150 as shown by 214. For example, single company directory 114 returns identity information 190 in a response having a first native response format. Single company directory 118 returns identity information 192 in a response having a second native response format. Multi-company directory 122 returns identity information 194 in a response having a third native response format. The present solution is not limited to the particulars of this example.

In 216, the plug-ins $110_1$-$110_4$ translate the format of the identity information from the native response formats to the common response format. An illustrative response in the common response format is provided below.

```
{
  "items": [
    {
      "accountName": "bradley.rowe",
      "userPrincipalName": "bradley.rowe@eng.example.com",
      "firstName": "Bradley",
      "lastName": "Rowe",
      "displayName": "Bradley Rowe",
      "securityId": "S-1-5-21-2775241788-1984989486-1945496558-1108",
      "isGroup": false,
      "groupScope": null,
      "isEnabled": true,
      "isAccountLocked": false,
      "isSecurityGroup": false,
      "groupCategory": "Security",
      "userGroupList": [
          "S-1-5-21-2775241788-1984989486-1945496558-513"
      ],
      "daysUntilPasswordExpiry": -1,
      "passwordNeverExpires": true,
      "email": "bradley.rowe@citrix.com",
      "streetAddress": "851 West Cypress Creek Road",
      "city": "Ft Lauderdale",
      "state": "FL",
      "country": "US",
      "workPhone": "954-267-3000",
      "homePhone": "954-555-1212",
      "mobilePhone": "754-555-1212",
      "guid": "7d7aa75a-b406-4449-bf13-4061cfca3f36",
      "distinguishedName": "CN=Bradley Rowe,CN=Users,DC=eng,DC=example, DC=com",
      "name": "Bradley Rowe",
      "canonicalName": "eng.example.com/MyUsers/Bradley Rowe",
      "domainName": "eng.example.com",
      "forestName": "example.com"
    }
  ]
}
```

Notably, there is not a distinction between "single customer directory claim" or "multi customer directory claim". The common formatted response is always of the same form regardless of the directory provider. However, based on the directory provider, some of the claim values may vary, as shown in the following Table 2.

TABLE 2

| Claim | AD | Azure AD | Citrix.com |
| --- | --- | --- | --- |
| securityId | always present | sometimes present | not present |
| userGroupList | list of securityIds | list of objectIds | not present |
| guid | global identifier | objectId | not present |
| distinguishedName | always present | not present | not present |
| canonicalName | always present | not present | not present |

In 218, the re-formatted identity information is then communicated to the common API 160. In turn, the common API 160 forwards the re-formatted identity information to the relaying party 106$_1$, as shown by 220. Notably, the re-formatted identity information includes all of the identity information 190-194 output from the plurality of directories 114-122. The relaying party 106$_1$ uses the re-formatted identity information in 222 for a variety of purposes. For example, the relaying party 106$_1$ uses the identity information to determine if the user is authorized to use a service. The present solution is not limited to the particulars of this example.

Figure 3:
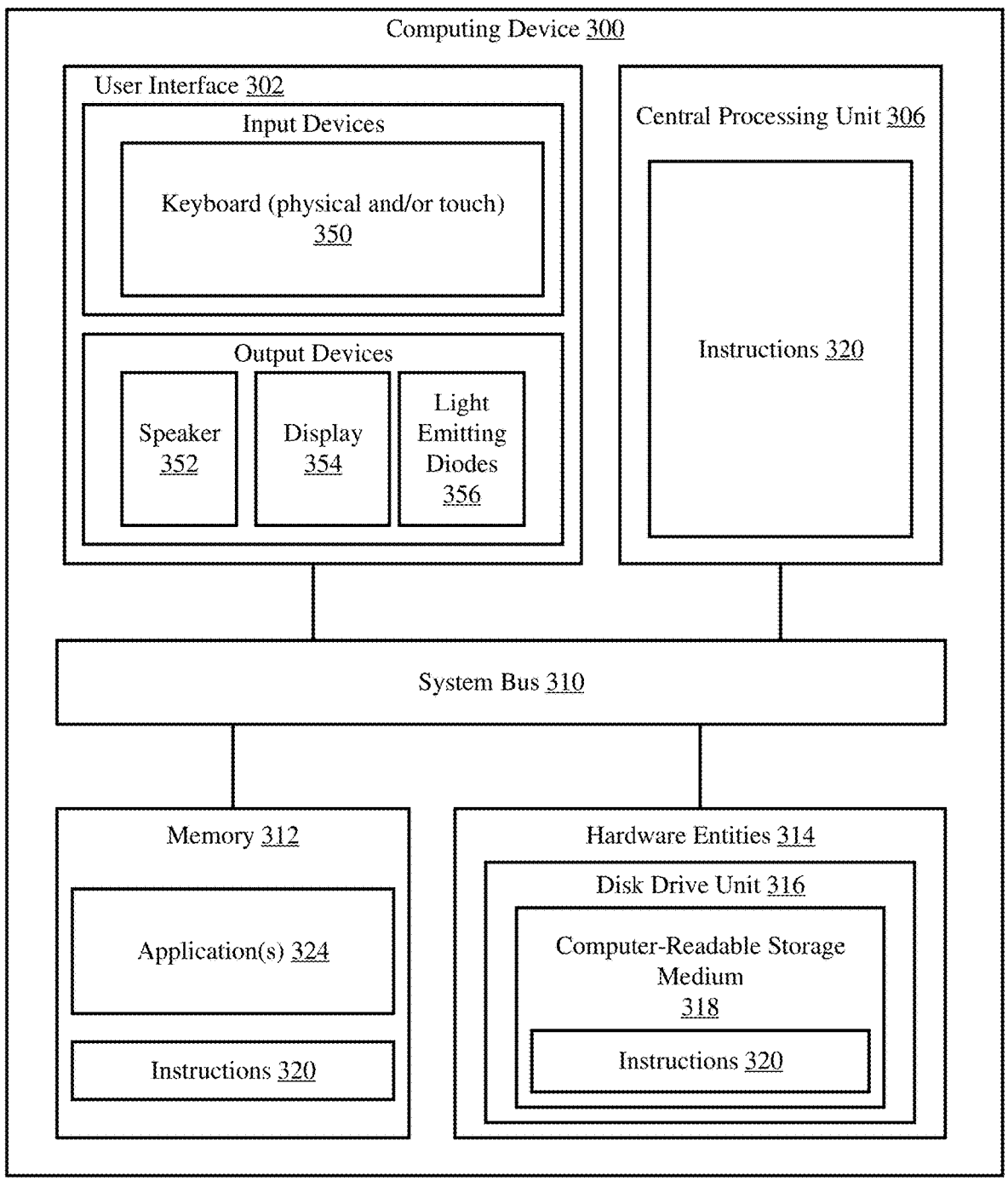
FIG. 3 provides an illustration of an exemplary computing device.

Referring now to FIG. 3, there is provided an illustration of an exemplary architecture for a computing device 300.

Computing devices 104$_1$-104$_4$, servers 106$_1$-106$_4$, and/or central identity system 150 of FIG. 1 (is)are the same as or similar to computing device 300. As such, the discussion of computing device 300 is sufficient for understanding these components of system 100.

In some scenarios, the present solution is used in a client-server architecture. Accordingly, the computing device architecture shown in FIG. 3 is sufficient for understanding the particulars of client computing devices and servers.

Computing device 300 may include more or less components than those shown in FIG. 3. However, the components shown are sufficient to disclose an illustrative solution implementing the present solution. The hardware architecture of FIG. 3 represents one implementation of a representative computing device configured to enable normalizing identity claims across disparate identity directories as described herein. As such, the computing device 300 of FIG. 3 implements at least a portion of the method(s) described herein.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices and output devices, which facilitate user-software interactions for controlling operations of the computing device 300. The input devices include, but are not limited, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating content sharing amongst users. In this regard, it should be understood that the electronic circuit can access and run application(s) 324 installed on the computing device 300. The functions of the software application(s) 324 are apparent from the above discussion of the present solution. For example, the software application is configured to perform one or more of the operations described above in relation to FIGS. 1-2.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method comprising:
   receiving, by a computing device, a request for identity information associated with an individual user of the system from a client device, the identity information being in a common request format supported by a common Application Programming Interface ("API");
   translating, by the computing device, the request from the common request format into a plurality of different directory search request formats, the plurality of different directory search requests including formats supported by a plurality of disparate directories, and the different directory search request formats being defined by a protocol of a respective directory;
   receiving, by the computing device, identity information associated with the individual user in response to the directory search request being sent to the plurality of disparate directories, the received identity information being in a native response format of one or more of the plurality of disparate directories from which the identity information was received;
   translating, by the computing device, the received identity information from a received native response format to a common response format supported by the API; and
   providing, by the computing device, the translated identity information to enable the plurality of disparate directories to respond to requests for identity information, the requests being in different directory search request formats, and the response by the plurality of disparate directories to the requests being configured to allow the client device to access a service of a relying party.

2. The method according to claim 1, wherein the request for identity information is received from the relying party computing device that is trying to acquire identity information associated with the individual user who logged into the relying party computing device.

3. The method according to claim 1, wherein the request for identity information is received from the relying party computing device that is trying to find identity information in order to assign access control, monitor or audit the individual user.

4. The method according to claim 1, wherein the plurality of different directory search request formats comprise an Analog Display Services Interface ("ADSI") protocol format, an Amazon Web Services ("AWS") protocol format, a Lightweight Directory Access Protocol ("LDAP") format, a Directory Access Protocol ("DAP") format, a Domain Name System ("DNS") protocol format, a Network Information Service ("NIS") protocol format, a Microsoft Graph API protocol format, or a proprietary protocol format.

5. The method according to claim 1, wherein the translating is performed by a plurality of plugins installed on the computing device.

6. A system, comprising:
   a plurality of disparate directories;
   a computing device communicatively coupled to the plurality of disparate directories, and configured to:
      receive a request for identity information associated with an individual user of the system from a client device, the identity information being in a common request format supported by a common Application Programming Interface ("API");
      translate the request from the common request format into a plurality of different directory request formats which includes formats supported by a plurality of disparate directories, and defined by a protocol of a respective directory;
      receive the identity information associated with the individual user in response to the different directory request being sent respectively to the plurality of disparate directories the received identity information being in a native response format of one or more of the plurality of disparate directories from which the identity information was received;
      translate, by the computing device, the received identity information from a received native response format to a common response format supported by the API; and
      provide, by the computing device, the translated identity information to enable the plurality of disparate directories to respond to requests for identity information, the requests being in different directory search request formats, and the response by the plurality of disparate directories to the requests being configured to allow the client device to access a service of a relying party.

7. The system according to claim 6, wherein the request for identity information is received from the relying party computing device that is trying to acquire identity information associated with the individual user who logged into the relying party computing device.

8. The system according to claim 6, wherein the request for identity information is received from the relying party computing device that is trying to find identity information in order to assign access control, monitor or audit the individual user.

9. The system according to claim 6, wherein the plurality of different directory request formats comprise an Analog Display Services Interface ("ADSI") protocol format, an Amazon Web Services ("AWS") protocol format, a Lightweight Directory Access Protocol ("LDAP") format, a Directory Access Protocol ("DAP") format, a Domain Name System ("DNS") protocol format, a Network Information Service ("NIS") protocol format, a Microsoft Graph API protocol format, or a proprietary protocol format.

10. The system according to claim 6, wherein the translating is performed by a plurality of plugins installed on the computing device.

* * * * *